(12) United States Patent
Chen

(10) Patent No.: US 11,475,142 B2
(45) Date of Patent: Oct. 18, 2022

(54) METHOD FOR AUTHORIZING OPERATION PERMISSION OF A STATISTICAL LIST

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 191 days.

(21) Appl. No.: 16/636,882

(22) PCT Filed: Aug. 6, 2018

(86) PCT No.: PCT/CN2018/099068
§ 371 (c)(1),
(2) Date: Feb. 5, 2020

(87) PCT Pub. No.: WO2019/029501
PCT Pub. Date: Feb. 14, 2019

(65) Prior Publication Data
US 2020/0364355 A1    Nov. 19, 2020

(30) Foreign Application Priority Data
Aug. 7, 2017    (CN) .......................... 201710668230.9

(51) Int. Cl.
*G06F 21/60* (2013.01)
*G06F 17/18* (2006.01)
(Continued)

(52) U.S. Cl.
CPC ............ *G06F 21/604* (2013.01); *G06F 17/18* (2013.01); *G06F 21/31* (2013.01);
(Continued)

(58) Field of Classification Search
CPC ........ G06F 21/604; G06F 17/18; G06F 21/31; G06F 21/6209; G06F 2221/2113; G06F 2221/2141; G06F 21/6245; G06Q 10/10
See application file for complete search history.

(56) References Cited

U.S. PATENT DOCUMENTS 10,057,227 B1 *   8/2018   Hess ....................... G06F 21/31
10,986,136 B1 *   4/2021   Natarajan ........... H04L 43/0876
(Continued)

FOREIGN PATENT DOCUMENTS

CN        1553380 A      12/2004
CN      101093524 A      12/2007
(Continued)

OTHER PUBLICATIONS

International Search Report in the international application No. PCT/CN2018/099068, dated Nov. 1, 2018.
(Continued)

*Primary Examiner* — Aravind K Moorthy
(74) *Attorney, Agent, or Firm* — Ladas & Parry, LLP

(57) ABSTRACT

Disclosed is a method for authorizing operation permissions of statistical list, comprising a statistical list operation permission authorization step and a step to select an authorized object; said statistical list operation permission authorization step comprises the following steps: S1: selecting a statistical list that needs to be authorized, and displaying the names of columns in the statistical list that require operation permission control; S2: separately authorizing operation permission for each column; in the step to select an authorized object, selecting one or a plurality of authorized objects. The present invention can achieve separate authorization of the operation permissions of each column in a statistical list, increasing the range of applications of the statistical list, improving the fineness of system management, and truly meeting the requirements of usage during actual operation of (Continued)

enterprises and institutions. It is displayed that when a recent operator performs traceability and accountability in the event of a permission authorization error, the most recent operating time is displayed, making it easy to intuitively determine whether it is necessary to re-authorize the statistical list operation permission.

9 Claims, 6 Drawing Sheets

(51) Int. Cl.
G06F 21/31 (2013.01)
G06F 21/62 (2013.01)
(52) U.S. Cl.
CPC .. *G06F 21/6209* (2013.01); *G06F 2221/2113* (2013.01); *G06F 2221/2141* (2013.01)

(56) References Cited

U.S. PATENT DOCUMENTS

| | | | |
|---|---|---|---|
| 11,232,226 B2* | 1/2022 | Chen | G06Q 10/0631 |
| 2006/0122812 A1* | 6/2006 | Tinseth | G06Q 10/10 |
| | | | 702/188 |
| 2006/0230282 A1* | 10/2006 | Hausler | G06F 21/6218 |
| | | | 713/182 |
| 2007/0260492 A1* | 11/2007 | Feied | G16H 10/60 |
| | | | 705/3 |
| 2009/0116700 A1* | 5/2009 | Wakabayashi | G07C 9/00571 |
| | | | 382/115 |
| 2009/0228958 A1* | 9/2009 | Miller | G06F 21/6218 |
| | | | 726/4 |
| 2009/0287656 A1* | 11/2009 | Bennett | G06F 16/24573 |
| 2010/0185675 A1* | 7/2010 | Song | G06F 21/6218 |
| | | | 707/783 |
| 2012/0042359 A1* | 2/2012 | Kuroda | G06F 21/41 |
| | | | 726/3 |
| 2012/0059931 A1* | 3/2012 | Graupner | G06Q 30/02 |
| | | | 709/224 |
| 2012/0197980 A1* | 8/2012 | Terleski | H04L 65/403 |
| | | | 709/203 |
| 2013/0133039 A1* | 5/2013 | Hayes | H04L 63/08 |
| | | | 726/4 |
| 2013/0133045 A1* | 5/2013 | Hayes | H04L 63/0807 |
| | | | 726/5 |
| 2014/0052928 A1* | 2/2014 | Shimoi | G06F 12/0862 |
| | | | 711/137 |
| 2014/0059017 A1* | 2/2014 | Chaney | G06F 16/25 |
| | | | 707/692 |
| 2014/0073435 A1* | 3/2014 | Liu | A63F 13/30 |
| | | | 463/42 |
| 2014/0181915 A1* | 6/2014 | Su | H04L 63/168 |
| | | | 726/4 |
| 2014/0229681 A1* | 8/2014 | McNutt | G06F 12/0862 |
| | | | 711/137 |
| 2014/0282886 A1* | 9/2014 | Karamchedu | H04L 63/10 |
| | | | 726/4 |
| 2014/0331317 A1* | 11/2014 | Singh | G06F 21/6218 |
| | | | 726/22 |
| 2015/0220852 A1* | 8/2015 | Hatami-Hanza | G06N 20/00 |
| | | | 706/12 |
| 2015/0379008 A1* | 12/2015 | Reiss | G06F 16/2358 |
| | | | 707/693 |
| 2016/0085954 A1* | 3/2016 | Tunnell | H04L 63/0853 |
| | | | 726/7 |
| 2016/0314549 A1* | 10/2016 | Carothers | G06F 3/0484 |
| 2016/0316348 A1* | 10/2016 | Trevathan | H04W 68/005 |
| 2016/0321323 A1* | 11/2016 | Gaumnitz | G06F 16/2272 |
| 2018/0060347 A1* | 3/2018 | Bhattacharjee | G06F 16/164 |
| 2018/0337784 A1* | 11/2018 | Jain | H04W 12/084 |
| 2018/0357418 A1* | 12/2018 | Li | G06F 21/57 |
| 2018/0373757 A1* | 12/2018 | Schukovets | G06F 21/6227 |
| 2020/0364364 A1* | 11/2020 | Chen | G06F 21/604 |

FOREIGN PATENT DOCUMENTS

| | | |
|---|---|---|
| CN | 101499906 A | 8/2009 |
| CN | 102053969 A | 5/2011 |
| CN | 105871813 A | 8/2016 |
| CN | 107480544 A | 12/2017 |
| KR | 20160084997 A | 7/2016 |

OTHER PUBLICATIONS

Written Opinion of the international Searching Authority in the international application No. PCT/CN2018/099066, dated Nov. 1, 2018 with English translation provided by Google Translate.
First Office Action and search report for Chinese patent application No. 201810886663.6, dated Jun. 8, 2020, with EN translation provided by Global Dossier.
Second Office Action for Chinese patent application No. 201810886663.6, dated Jan. 18, 2021 with EN translation provided by Global Dossier.
Notification to grant patent right for invention for Chinese patent application No. 201810886663.6, dated Apr. 1, 2021, with EN translation provided by Global Dossier.

\* cited by examiner

| Select a grantee | Select a statistical list | Operation permission authorization | | |
|---|---|---|---|---|
| Finance department<br><br>✓ Zhang San<br>Li Er<br>Wang Wu<br>······ | Statistical list of orders<br>Statistical list of work attendance<br>✓ Statistical list of sales results<br>······ | Column name | View | ··· ··· |
| | | Employee ID | ✓ | |
| | | Name | ✓ | |
| | | Department | ✓ | |
| | | Position | ✓ | |
| | | Amount of signed contracts | | |
| | | Amount of received payments | ✓ | |
| | | Amount of royalties | | |
| | | Disbursement status | | |
| | | ··· | | |

FIG. 5

Statistical list of sales results

| Employee ID | Name | Department | Position | Amount of signed contracts | Amount of received payments | Amount of royalties | Disbursement status |
|---|---|---|---|---|---|---|---|
| 1 | Zheng San | Salesperson | Sales assistant | *** * | 8000 | *** | * ** |
| 2 | Zheng Si | Salesperson | Sales advisor | *** | 10000 | *** | *** |
| *** *** | *** *** | *** *** | *** *** | *** *** | *** *** | *** *** | *** *** |

FIG. 6

Statistical list of sales results

| Employee ID | Name | Department | Position | Amount of received payments |
|---|---|---|---|---|
| 1 | Zheng San | Salesperson | Sales assistant | 8000 |
| 2 | Zheng Si | Salesperson | Sales advisor | 10000 |
| *** *** | *** *** | *** *** | *** *** | *** *** |

FIG. 7

| Select a grantee | Select a statistical list | Operation permission authorization | | |
|---|---|---|---|---|
| Finance department<br><br>✓ Zhang San<br>✓ Li Er<br>Wang Wu<br>...... | Statistical list of orders<br><br>Statistical list of work attendance<br><br>✓ Statistical list of sales results<br><br>... ... | Column name | View | ... ... |
| | | Employee ID | | |
| | | Name | | |
| | | Department | | |
| | | Position | | |
| | | Amount of signed contracts | | |
| | | Amount of received payments | | |
| | | Amount of royalties | | |
| | | Disbursement status | | |
| | | ... | | |

FIG. 8

| Select a grantee | Select a statistical list | Last authorizer: Li Si;<br>Operation time: 2015-5-21, 11:00 | | |
|---|---|---|---|---|
| Finance department<br><br>✓ Zhang San<br>Li Er<br>Wang Wu<br>...... | Statistical list of orders<br><br>Statistical list of work attendance<br><br>✓ Statistical list of sales results<br><br>... ... | Operation permission authorization | | |
| | | Column name | View | ... ... |
| | | Employee ID | ✓ | |
| | | Name | ✓ | |
| | | Department | ✓ | |
| | | Position | ✓ | |
| | | Amount of signed contracts | | |
| | | Amount of received payments | ✓ | |
| | | Amount of royalties | | |
| | | Disbursement status | | |
| | | ... | | |

FIG. 9

| Select a grantee | Select a statistical list | Last authorizer: Li Si; Operation time:2017-5-1,14:00 | | |
|---|---|---|---|---|
| Finance department | Statistical list of orders | Operation permission authorization | | |
| | Statistical list of work attendance | Column name | View | ••• ••• |
| Zhang San | ✓ Statistical list of sales results | Employee ID | ✓ | |
| ✓ Li Er | | Name | ✓ | |
| Wang Wu | | Department | ✓ | |
| ••• ••• | ••• ••• | | | |
| | | Position | ✓ | |
| Select an authorization template | | Amount of signed contracts | | |
| | | Amount of received payments | ✓ | |
| ✓ Zhang San Created template 1 Created template 2 ••• ••• | | Amount of royalties | | |
| | | Disbursement status | | |
| | | ••• | | |

FIG. 10

METHOD FOR AUTHORIZING OPERATION PERMISSION OF A STATISTICAL LIST

CROSS-REFERENCE TO RELATED APPLICATIONS

This application is the U.S. national phase of PCT/CN2018/099068 filed on Aug. 6, 2018, which claims priority to Chinese Application No. 201710668230.9 filed on Aug. 7, 2017, the disclosures of which are incorporated by reference herein in their entireties.

BACKGROUND

Technical Field

The present invention relates to a method for authorizing operation permissions of statistical list in management software such as ERP and CRM.

Related Art

A statistical list is different from the concept of a form: (1) The authorization of a form mainly represents addition, deletion, modification, and viewing of data in a database or form, while the operations on a statistical list do not modify the data in the database or form but only query the data in the database in a desired manner; (2) a form represents a service object such as an order, a contract, a customer, or the like. Each piece of form data corresponds to a unique service object. For example, a customer 001 in the customer form represents a unique customer 001 (the customer 001 is a piece of form data or an object). However, a statistical list is generally statistics on one or more forms collected in a desired manner. A row of data in the statistical list is not a service object, but a statistical result. For example, statistics of sales contracts are based on each signing department. Each row of statistical data represents the statistics on all sales contracts undertaken by one signing department, and may include statistics of the quantity of signed contracts, statistics of the amount of signed contracts, statistics of amount of received payments, statistics of the quantity of orders, and the like.

A statistical list is used to perform centralized statistics of and display specified content or data in a system. A general software system has functions of displaying and viewing a statistical list. However, in a conventional software system, a grantee either can research the content in all columns from statistical list or can see nothing of the entire statistical list. Consequently, it is impracticable to implement fine-tuned management of operation permissions for each column in a statistical list, and the usage is greatly limited. For example, in a "Sales performance statistical list", column names include employee ID, name, department, position, amount of signed contracts, amount of received payments, amount of royalties, and status of disbursement. Now Zhang San, an employee of the finance department, needs to check whether the data of the amount of received payments is accurate. Therefore, Zhang San needs to be authorized to view the statistical list. Once authorized, Zhang San can see content of all columns in the statistical list, including sensitive or private data such as the amount of signed contracts and the amount of royalties (however, the company does not intend the sensitive or private data such as the amount of signed contracts and the amount of royalties to be visible to Zhang San).

In addition, the conventional software system also has the following defects: (1) in performing an authorization operation, the authorizer who last performed an authorization operation and the time of such operation cannot be displayed. When an authorization error occurs, accountability cannot be achieved, authorization time is not available to the current authorizer for reference, and the system is not easy to use. (2) it is impracticable to authorize statistical list operations for multiple grantees in batches or perform authorization by using a template, thereby leading to a low authorization efficiency. In a large software system, there are many statistical lists, and the conventional authorization manner involves a heavy workload.

Role-based access control (RBAC) is one of the most researched and matured permission management mechanisms for database in recent years. It is considered to be an ideal candidate to replace conventional mandatory access control (MAC) and discretionary access control (DAC). Conventional discretionary access control has high flexibility but low security. Mandatory access control is highly secure but too restrictive. Role-based access control combines both above, and not only is easy to manage, but also reduces complexity, costs, and probability of errors. Therefore, it has been greatly developed in recent years. The basic idea of role-based access control (RBAC) is to divide different roles according to different functional positions in an enterprise organization view, encapsulate an access permission of database resources in roles, and allow users to indirectly access the database resources by being assigning different roles to the users.

A large number of tables and views are often built in large-scale application systems, which makes the management and permissions of database resources very complicated. It is very difficult for the user to directly manage the access and permissions of the database resources. It requires the user to have a very thorough understanding of the database structure and to be familiar with the use of the SQL language, Once the structures or security requirements of the application systems have changed, a large number of complex and cumbersome permission changes are required, and the security vulnerabilities caused by some unexpected authorization errors are very likely to occur. Therefore, designing a simple and efficient permission management method designed for large-scale application systems has become a common requirement for system and system users.

The role-based permission control mechanism can manage the access permissions of the system simply and efficiently, which greatly reduces the burden and cost of the system permission management, and makes the system permission management more compliant with the business management specifications of the application system.

However, the conventional role-based user permission management method adopts a "role-to-user one-to-many" relation mechanism, where the "role" is a group or class in nature, that is, one role can simultaneously correspond to/be relate to multiple users. The role is similar to a post/position/type of work or other concepts, The permissions authorized to a user under this relation mechanism are basically divided into the following three forms: 1, as shown in FIG. 1, the permissions are directly authorized to the user, where the disadvantage is that the workload is large and the operation is frequent and troublesome. When changes on the employee have occurred (such as transfer or resignation), all form operation permissions related to the employee shall be adjusted accordingly. Especially, for changes on an employee in a management position of an enterprise, many approval processes are involved. As the permission adjustment involves large workloads and is cumbersome, errors or omissions are likely to occur, affecting the normal operation of the enterprise and even causing unpredictable losses.

2. As shown in FIG. 2, the role (having the nature of a class/group/post/type of work) is authorized (one role can be related to multiple users), and the user obtains permission through its role; 3. As shown in FIG. 3, the above two methods are combined.

In the above descriptions, as both 2 and 3 need to authorize the role having the nature of a class/group, the way of authorization through the role in the nature of class/group/post/type of work has the following disadvantages: 1. when the user's permissions change, the operation is difficult: in the actual process of using a system, it is often necessary to adjust the user's permissions during the operation process. For example, when the employee's permission changes, the authority of an employee related to the role changes, we can't change the permissions of the entire role because of the change in the individual employee's permissions, because this role is also related to other employees whose permissions remain unchanged. So to cope with this situation, either create a new role to satisfy the employee whose permissions have changed, or directly authorize (disengaged from the role) from the employee based on the permission requirements. The above two processing methods not only require a long time for the role authorization in the case of a large number of role permissions, but also are easy to make mistakes, the user is cumbersome and troublesome to operate, and errors occur easily, resulting in loss to the system user.

When the approval permissions of the employee/user have changed, either the employee/user is disengaged from the role, or a new role is added to meet the requirements of work. The defect of the first way is the same as that of the foregoing method of "direct authorization to the user". In the second way, adding a new role involves creation, relation and authorization of the role. Especially when there are many roles and many users related to the roles, it is difficult to remember which users are related to the role.

2. It is difficult to remember the specific permissions contained in a role for a long time: If the role has many permission function points, it will be difficult to remember the specific permissions of the role, and it is even more difficult to remember the differences in permissions of the roles with similar permissions. If a new user needs to be associated, it is impracticable to accurately determine how to select a role for relation.

3. Because user permissions change, more roles will be created (if you do not create a new role, it will greatly increase the authorization directly to the user), and it is more difficult to distinguish the specific differences between permissions of the roles.

4. When a user is transferred from a post, if many permissions of the transferred user need to be assigned to other users, separating the permissions of the transferred users and creating roles to relate to other users respectively are necessary. Such operations are not only complicated and time-consuming, but also prone to errors.

SUMMARY

Technical Problems

The objectives of the present invention are to overcome the disadvantages of the prior art, provide a method for authorizing operation permissions of statistical list, authorize operations on each column in the statistical list separately, increase the scope of application of the statistical list, improve the fine-tuning of system management, and meet usage requirements of enterprises and institutions in actual operations.

Solutions to Problems

Technical Solutions

The objectives of the present invention are achieved by the following technical solutions. A method for authorizing operation permissions of statistical list comprises a step of authorizing a statistical list operation and a step of selecting a grantee, wherein the order between the step of authorizing a statistical list operation and the step of selecting a grantee is not limited. The step of authorizing a statistical list operation includes the following steps: S1: selecting a statistical list needing authorization, and displaying a column name of a column needing operation permission control from the statistical list; and S2: authorizing an operation permission for each column separately, where in the step of selecting a grantee, one or more grantees are selected.

The method for authorizing operation permissions of statistical list, further comprises a step of setting an authorization period of a time-nature column, wherein after a time-nature column is selected, it displays a six authorization period setting formats for an authorizer to perform corresponding time setting, and the said six authorization period setting formats specifically include: a period from a time point earlier than current time by a fixed time length to the current time, a period from a start time to current time, a period from an end time to a system initial time, a period from start time to end time, a period with a time column of a null value, and a period from the system initial time to the current time, wherein the period from the system initial time to the current time includes the period with a time column of a null value.

The authorized operation includes viewing/querying.

A column not authorized for viewing is displayed in one or more of the following manners: (1) displaying a column name of the column, but hiding corresponding column content by using a hider character; and (2) displaying neither the column name of the column nor the corresponding column content.

When only one grantee is selected and when the statistical list needing authorization is selected, authorization status of an operation permission previously authorized for the grantee to operate each column needing operation permission control in the statistical list is displayed.

When two or more grantees are selected and when the statistical list needing authorization is selected, the column needing operation permission control in the statistical list is displayed, but previous authorization status of each column needing operation permission control is not displayed.

When only one grantee is selected and when the statistical list needing authorization is selected, an authorizer who last performs an authorization operation on the statistical list for the grantee and time of such operation are displayed.

The method for authorizing operation permissions of statistical list further comprises a step of authorizing a template, specifically including: (1) selecting a grantee and a statistical list needing authorization: selecting one or more grantees, and selecting one statistical list needing authorization; (2) authorizing the grantee: selecting an existing authorized grantee or a created template as an authorization template, and granting statistical list operation permissions of the authorization template to the grantee; and (3) performing a save operation after modification or no modification to obtain an operation permission for the grantee to operate the statistical list.

The method for authorizing operation permissions of statistical list comprising a step of authorizing a statistical list operation and a step of selecting a to-be-authorized role, where the order between the step of authorizing a statistical list operation and the step of selecting a to-be-authorized role is not limited. The step of authorizing a statistical list operation includes the following steps: S1: selecting a statistical list needing authorization, and displaying a column name of a column needing operation permission control in the statistical list; and S2: authorizing an operation permission for each column separately, wherein in the step of selecting a to-be-authorized role, one or more to-be-authorized roles are selected, each of to-be-authorized roles is a role having an independent individual nature not a group/class, and during the same period, one role having an independent individual nature can only be related to a unique user, while one user is related to one or more roles having an independent individual nature.

If the user needs to be transferred from a post, the method further comprising a step of managing user transfer, specifically including: (1) canceling a relation of the user to an original role; and (2) relating the user to a new role to which the user is transferred, whereby the user automatically obtains statistical list operation permissions of the new role.

The method for authorizing operation permissions of statistical list further comprising a step of authorizing a template, specifically including: (1) selecting a to-be-authorized role and statistical list needing authorization: selecting one or more to-be-authorized roles, and selecting one statistical list needing authorization; (2) authorizing the to-be-authorized roles: selecting an existing role or a created template as an authorization template, and granting statistical list operation permissions of the authorization template to the to-be-authorized role; and (3) performing a save operation after modification or no modification to obtain an operation permission for the to-be-authorized role to operate the statistical list.

Beneficial Effects of the Invention

Beneficial Effects

The present invention has the following beneficial effects: 1. The present invention can be implemented to authorize operations on each column in a statistical list separately, increase the scope of application of one statistical list, improve the fine-tuning of system management, and meet usage requirements of enterprises and institutions in actual operations.

For example, in a "Sales performance statistical list", column names include employee ID, name, department, position, amount of signed contracts, amount of received payments, amount of royalties, and status of disbursement. Now Zhang San, an employee of the finance department, needs to check whether the data of the amount of received payments is accurate. Therefore, Zhang San may be authorized to view the content of the columns "employee ID", "name", "department", "position", and "amount of received payments" in the statistical list. Once authorized, Zhang San can see only the content of such authorized columns, but cannot see sensitive or private data such as the amount of signed contracts and the amount of royalties.

2. When one grantee is selected and the statistical list needing authorization is selected, the authorizer who last performed an authorization operation for the grantee to operate the statistical list and the time of such operation can be displayed. The display of the last authorizer makes authorization errors easily traceable and accountable, and the display of the last authorization operation time makes it convenient to intuitively determine whether the statistical list operation permissions need to be re-authorized.

For example, at 11:00 on May 21, 2015, Li Si last authorized the grantee Zhang San to operate the "Sales performance statistical list". When Zhang San is selected as a grantee and when the "Sales performance statistical list" is selected as the statistical list needing authorization, the authorizer of this authorization operation can see that at 11:00 on May 21, 2015, Li Si last authorized Zhang San to operate the "Sales performance statistical list".

If Zhang San is not entitled to view the content of a sensitive/private column but the last authorization enables Zhang San to view the content of the sensitive/private column, the last authorizer can be searched out as a responsibility taker in the subsequent process of investigating responsibility.

For another example, an authorizer needs to authorize 100 grantees to operate a statistical list, but completes the authorization operations for only 70 grantees in a day. When the authorizer continues to perform authorization operations the next day, the authorizer may determine, by checking the time at which each grantee was last authorized, whether the grantee needs to be authorized. The authorizer may also designate an authorization time interval, and search out all grantees who are authorized in the designated time interval. By checking the last time of authorizing the grantee, the authorizer can find how long the permission of the grantee has remained unchanged, thereby helping to intuitively determine whether the grantee needs to be re-authorized.

3. This method enables selection of multiple grantees simultaneously for being authorized in batches, thereby improving authorization efficiency; In addition, the method supports template authorization. That is, an existing authorized grantee/role or a created template is selected as an authorization template. The statistical list operation permissions of the authorization template are directly granted to (updated for) the grantee (and saved after being simply modified). The authorization operation is simple and efficient. By combining the two manners, efficiency of authorizing operations for the statistical list in the system is improved greatly.

4. In the present invention, the grantee has a role of an independent individual nature. When an employee is resigned or transferred from a post, the operation permissions for the statistical list are handed over and updated simply by creating or canceling a relation of the user to role, thereby achieving seamless handover of the operation permissions, ensuring timely update of the user's operation permissions for the statistical list, avoiding hysteresis or omission of update of the operation permissions, avoiding impact on the normal operation of the enterprise, and avoiding the risk of leaking confidential information.

Resignation example: The user corresponding to an employee Zhang San is related to a role "production worker 1". When Zhang San is resigned, the system administrator (or the corresponding administrator) directly cancels the relation between the user corresponding to Zhang San and the role "production worker 1". Therefore, Zhang San automatically loses the statistical list operation permissions corresponding to "production worker 1", thereby avoiding hysteresis of handover of the statistical list operation permissions, and preventing relevant confidential information from being leaked to Zhang San in the case that Zhang San still has the permission to view certain confidential information after resignation due to the hysteresis. When a new employee Li Si takes over Zhang San's work, the user corresponding to Li Si is directly related to "production worker 1". In this way, Li Si automatically obtains the statistical list operation permissions corresponding to the role "production worker 1", and it is not necessary to set the statistical list operation permissions for Li Si again, thereby simplifying and quickening the operations and greatly reducing the workload.

Job transfer example: An employee Zhang San needs to be transferred from Production department to After-sales department. The system administrator (or the corresponding administrator) cancels the relation between the user corresponding to Zhang San and the original role "production worker 1", and relates Zhang San to a new role "after-sales staff 3" of the after-sales department, so that Zhang San automatically obtains the statistical list operation permissions corresponding to the role "after-sales staff 3".

5. In the present application, the role is in one-to-one relation to the user. One role can only be related to a unique user during the same period, and one user is related to one or more roles. The advantage thereof is that permissions can be obtained as long as a user is related to the role (that is, a user obtains the permissions of its related role), and changes permissions of the role are much fewer than the changes of the user's permissions in a conventional mechanism. As there are few changes of the quantity of roles having the nature of an independent individual in nature (the nature of a post number/a work station number), Although there is large employee turnover, few changes occur in the post number/work station number (even if there is no change in a certain period, that is, the role does not change). This greatly simplifies user's permission management and reduces system overheads.

6. The operations such as dynamic management, recruitment, and transfer are simple, convenient, efficient and highly reliable. The application of recruitment/resignation/transfer in the approval process is simple. When an employee/a user has changed, it is unnecessary to reset permissions. It is only necessary for a user to cancel the relation to the role or be related to the role. For the user who is no longer in the role, the relation to the role is canceled, and the user who takes over the role is related to the role of the post number. The user related to the role automatically obtains the statistical list operation permission of that role, without re-authorizing the role, thus greatly improving the efficiency, security, and reliability of the system setting.

For example, because a user Zhang San is transferred or resigns from a post, Zhang San no longer works as the role of "purchaser 3", and Zhang San then cancels the relation to the role of "purchaser 3". Meanwhile, Li Si takes over the work as the role of "purchaser 3", and it only needs to relate Li Si to the role, so Li Si automatically obtains the statistical list operation permission of the role of "purchaser 3".

7. The conventional permission management mechanism defines the role as the nature of a group, a type of work, a class or the like. The role is in a one-to-many relation to the user. In the actual process of using a system, the user's permissions often need to be adjusted during the operation process. For example, in processing the change of an employee's permissions, when the permissions of the employee related to the role have changed, it is improper to change the permissions of the entire role due to the change in the permissions of the individual employee, because this role is also related to other employees whose permissions remain unchanged. To cope with this situation, either a new role is created to fit the employee whose permissions have changed, or permissions are directly authorized to the employee (disengaged from the role) based on permission requirements. The above two processing methods not only take a long time but also cause mistakes easily during the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method of the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (the permissions of the user/role have changed dynamically), the solutions in the present application can significantly improve the permission management efficiency for the system user when using the system, make the dynamic authorization simpler, more convenient, clearer and more explicit, and improve the efficiency and reliability of the permission setting.

8. The conventional role authorization method with the nature of a group is prone to errors. The method provided in the present application significantly reduces the probability of authorization errors, because the method of the present application only needs to consider the role as an independent individual, without considering the commonalties of multiple users related to the role having the nature of a group under the conventional method. Even if the authorization errors occur, only the user related to the role is affected. However, in the case of the conventional role having the nature of a group, all users related to the role will be affected. Even if the authorization errors occur, the correction method of the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

9. In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a work station number, such that the selection can be made easily.

10. When a user is transferred from a post, if many permissions of the transferred user need to be assigned to other users, in processing, it is necessary to distinguish the permissions of the transferred user and create roles to be related to other users respectively. The operations are complicated, time-consuming, and prone to errors.

The method of the present application is as follows: The transferred user is related to several roles. When the user is transferred, the relation of the user to the roles in the original department is first canceled (the canceled roles may be re-related to other users), and then the user is related to a role in a new department. The operation is simple and not error-prone.

BRIEF DESCRIPTION OF THE DRAWINGS

Description of Drawings

Figure 1:
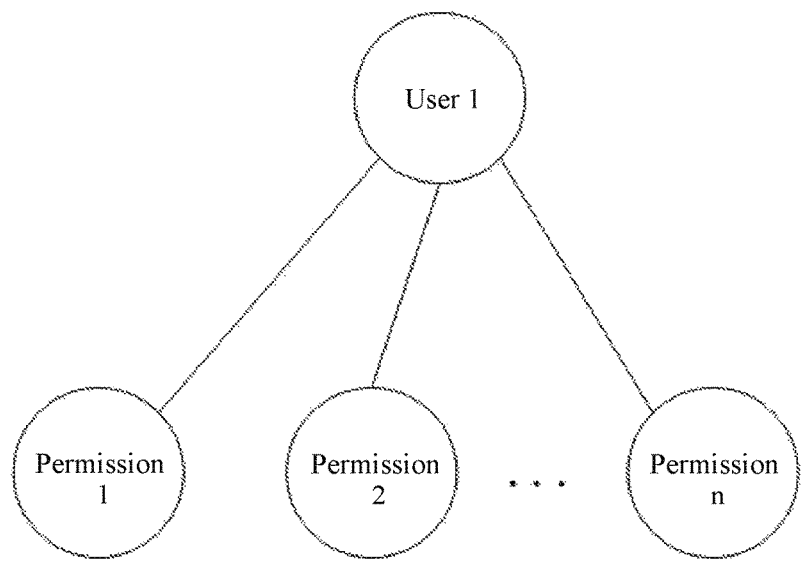
Figure 2:
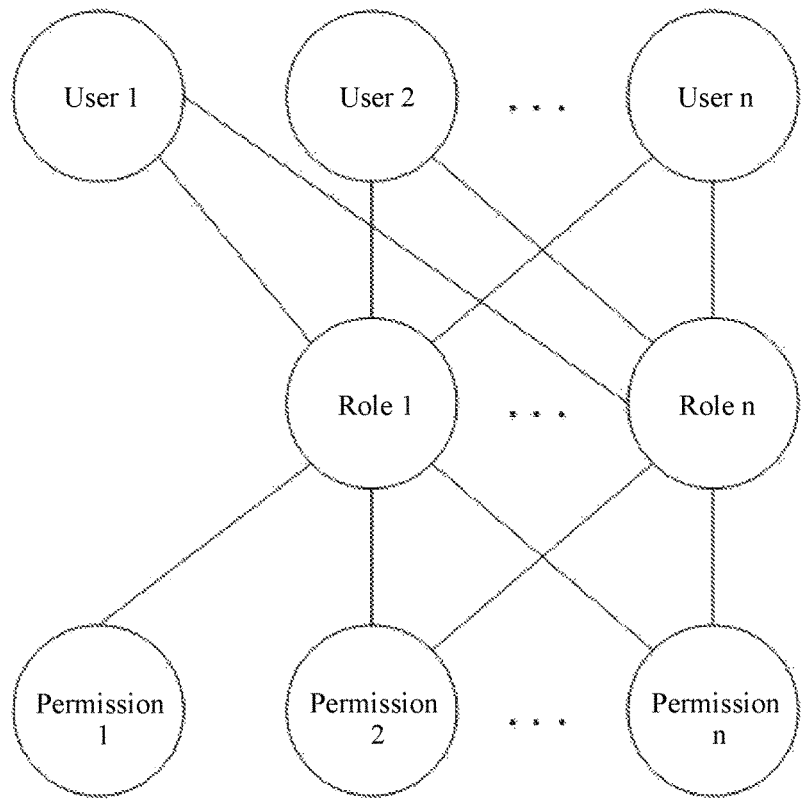
Figure 3:
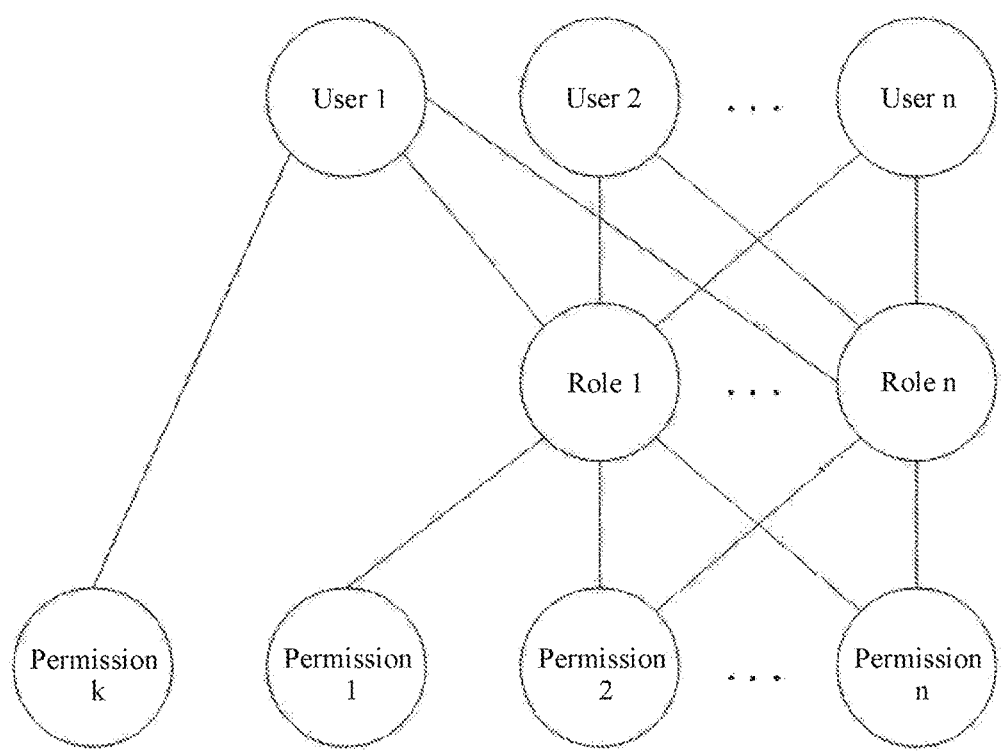
Figure 4:
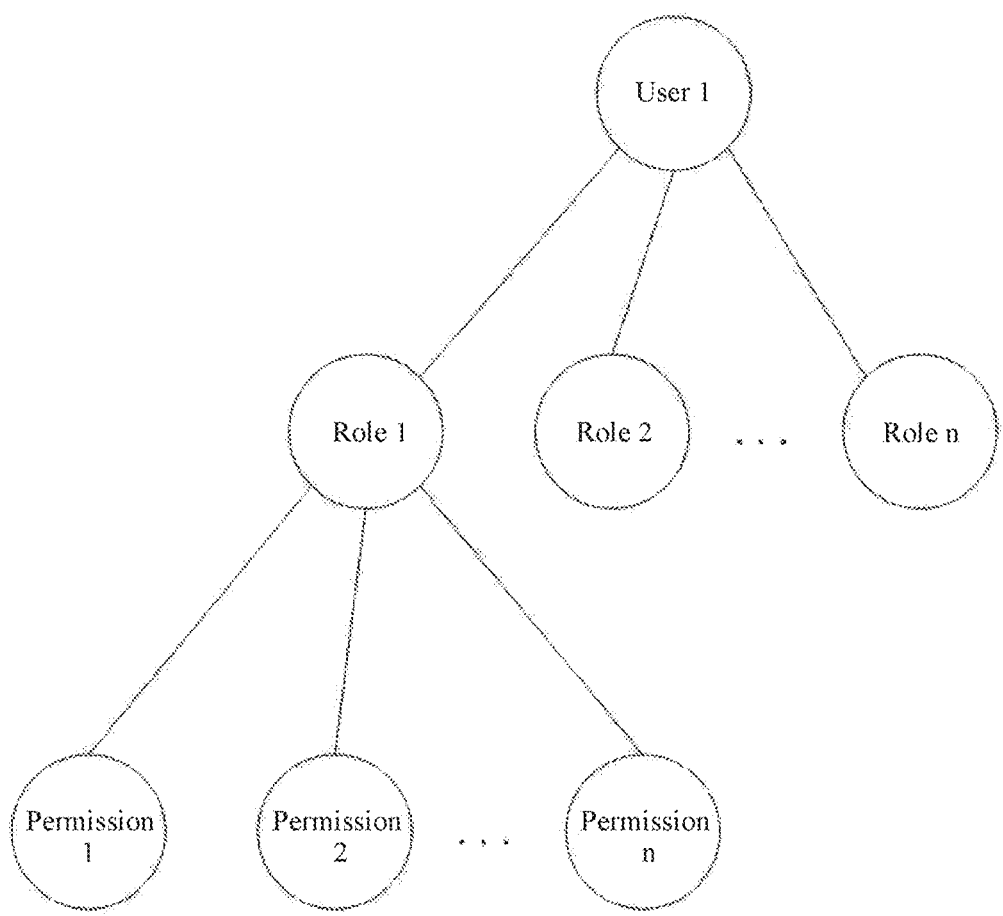

FIG. 1 is a schematic diagram in which a system directly authorizes a user in the prior art;

FIG. 2 is a schematic diagram in which a system authorizes a role having the nature of a group/class in the prior art;

FIG. 3 is a schematic diagram in which a system both directly authorizes a user and authorizes a role having the nature of a group/class in the prior art;

FIG. 4 is a schematic diagram in which a system authorizes a user through a role having the nature of an independent individual according to the present invention;

FIG. 5 is a schematic diagram in a case that one grantee is selected and a statistical list is selected according to the present invention;

FIG. 6 is a schematic diagram of a way of displaying a statistical list according to the present invention;

FIG. 7 is a schematic diagram of another way of displaying a statistical list according to the present invention;

FIG. 8 is a schematic diagram in a case that multiple grantees are selected and a statistical list is selected according to the present invention;

FIG. 9 is a schematic diagram of displaying a grantee who last performs an authorization operation and time of such operation according to the present invention; and FIG. 10 is a schematic diagram of using an authorization template to authorize a grantee according to the present invention.

DETAILED DESCRIPTION

The following describes technical solutions of the present invention in further detail with reference to accompanying drawings, but the protection scope of the present invention is not limited to the following descriptions.

Embodiment 1

The method for authorizing operation permissions of statistical list comprising a step of authorizing a statistical list operation and a step of selecting a grantee, wherein the grantee may be an employee, a user, a role of a group/class nature, or the like. The step of authorizing a statistical list operation includes the following steps: S1: selecting a statistical list needing authorization, and displaying a column name of a column needing operation permission control in the statistical list; and S2: as shown in FIG. 5, authorizing an operation permission for each column separately, where in the step of selecting a grantee, one or more grantees are selected.

In this embodiment, the authorized operation includes viewing.

A column not authorized for viewing is displayed in one or more of the following manners: (1) as shown in FIG. 6, displaying a column name of the column, but hiding corresponding column content by using a hider character; and (2) as shown in FIG. 7, neither the name of the column nor the content of the column is displayed ("neither is displayed" may also be expressed as "none is displayed". For example, in FIG. 7, none of the statistical data identified by " . . . " is displayed. That is, the row is not displayed or disappears).

The present invention can be implemented to authorize operations on each column in a statistical list separately, increase the scope of application of the statistical list, improving the fine-tuning of system management, and meeting usage requirements of enterprises and institutions in actual operations.

For example, in a "Sales performance statistical list", column names include employee ID, name, department, position, amount of signed contracts, amount of received payments, amount of royalties, and status of disbursement. Now Zhang San, an employee of the finance department, needs to check whether the data of the amount of received payments is accurate. Therefore, Zhang San may be authorized to view the content of the columns "employee ID", "name", "department", "position", and "amount of received payments" in the statistical list. Once authorized, Zhang San can see only the content of such authorized columns, but cannot see sensitive or private data such as the amount of signed contracts and the amount of royalties.

Embodiment 2

When only one grantee is selected and when the statistical list needing authorization is selected, authorization status of an operation permission previously authorized for the grantee to operate each column needing operation permission control in the statistical list is displayed (as shown in FIG. 5).

Embodiment 3

When two or more grantees are selected and when the statistical list needing authorization is selected, the column needing operation permission control in the statistical list is displayed, but previous authorization status of each column needing operation permission control is not displayed (as shown in FIG. 8).

Embodiment 4

As shown in FIG. 9, when only one grantee is selected and the statistical list needing authorization is selected, an authorizer who last performs an authorization operation on the statistical list for the grantee and time of such operation are displayed.

The display of the last grantee makes authorization errors easily traceable and accountable. By displaying the last operation time, it is more convenient to intuitively determine whether the statistical list operation permission needs to be re-authorized.

For example, at 11:00 on May 21, 2015, Li Si last authorized a grantee Zhang San to operate the "Sales performance statistical list". When Zhang San is selected as a grantee and when the "Sales performance statistical list" is selected as the statistical list needing authorization, the authorizer of this authorization operation can see that at 11:00 on May 21, 2015, Li Si last authorized Zhang San to operate the "Sales performance statistical list".

If Zhang San is not entitled to view the content of a sensitive/private column but the last authorization enables Zhang San to view the content of the sensitive/private column, the last authorizer can be searched out as a responsibility taker in the subsequent process of investigating responsibility.

For another example, an authorizer needs to authorize 100 grantees to operate a statistical list, but completes the authorization operations for only 70 grantees in a day. When the authorizer continues to perform authorization operations the next day, the authorizer may determine, by checking the time at which each grantee was last authorized, whether the grantee needs to be authorized. The authorizer may also designate an authorization time interval, and search out all grantees who are authorized in the designated time interval. By checking the last time of authorizing the grantee, the authorizer can find how long the permission of the grantee has remained unchanged, thereby helping to intuitively determine whether the grantee needs to be re-authorized.

Embodiment 5

The method for authorizing operation permissions of statistical list further comprising a step of authorizing a template, specifically including: (1) selecting a grantee and the statistical list needing authorization: selecting one or more grantees, and selecting one statistical list needing authorization; (2) authorizing the grantee: selecting an existing authorized grantee or a created template as an authorization template, and granting statistical list operation permissions of the authorization template to the grantee; and (3) performing a save operation after modification or no modification to obtain an operation permission for the grantee to operate the statistical list.

For example, as shown in FIG. 10, Zhang San's operation permissions for the Sales performance statistical list are used as an authorization template for authorizing Li Er.

This method enables selection of multiple grantees simultaneously for being authorized in batches, thereby improving authorization efficiency. In addition, the method supports template authorization. That is, an existing authorized grantee/role or a created template is selected as an authorization template. The statistical list operation permissions of the authorization template are directly granted to (updated for) the grantee (and saved after being simply modified). The authorization operation is simple and efficient. By combining the two manners, efficiency of authorizing operations for the statistical list in the system is improved greatly.

Embodiment 6

The method for authorizing operation permissions of statistical list comprising a step of authorizing a statistical list operation and a step of selecting a to-be-authorized role, wherein the order between the step of authorizing a statistical list operation and the step of selecting a to-be-authorized role is not limited. The step of authorizing a statistical list operation includes the following steps: S1: selecting a statistical list needing authorization, and displaying a column name of a column needing operation permission control in the statistical list; and S2: authorizing an operation permission for each column separately, wherein further, the columns include time-nature columns named, for example, contract signing time, payment receipt time, and outbound time. After a permission for viewing a time-nature column is set, a time statistics/query range of the column may also be set. Specifically, after a time-nature column is selected, six authorization period setting formats are displayed for the authorizer to set time accordingly. The six authorization period setting formats specifically include: a period from a time point earlier than current time by a fixed time length to the current time (the current time is dynamic), a period from a start time to the current time, a period from an end time to a system initial time, a period from the start time to the end time, a period with a time column of a null value, and a period from the system initial time to the current time, wherein the period from the system initial time to the current time includes the period with a time column of a null value. The start time and the end time are manually set by the authorizer. The period with a time column of a null value and the period from the system initial time to the current time may be options (the period from the system initial time to the current time may also be expressed as all time, that is, the current time and all time before the current time) available for being selected by the authorizer.

In the step of selecting a to-be-authorized role, one or more to-be-authorized roles are selected. As shown in FIG. 4, each of the to-be-authorized roles is a role having an independent individual nature not a group/class, and in the same period, one role having an independent individual nature can only be related to a unique user, while one user is related to one or more roles having an independent individual nature (as shown in FIG. 4, the role is authorized according to the work content of the role, and the user obtains the permissions of the role related to the user).

Further, if a department is selected for a role when or after the role is created, the role belongs to the department, the role is authorized according to the work content of the role, the name of the role is unique in the department, and the number of the role is unique in the system. When said user is transferred from a post, the user's relation to an original role is canceled, and the user is related to a new role.

If the user needs to be transferred from a post, the method further comprising a step of managing user transfer, specifically including: (1) canceling a relation between the user and an original role; and (2) relating the user to a new role to which the user is transferred, whereby the user automatically obtains statistical list operation permissions of the new role.

In this embodiment, the method further comprises a step of authorizing a template, specifically including: (1) selecting a to-be-authorized role and the statistical list needing authorization: selecting one or more to-be-authorized roles, and selecting one statistical list needing authorization; (2) authorizing the to-be-authorized roles: selecting an existing role or a created template as an authorization template, and granting statistical list operation permissions of the authorization template to the to-be-authorized role; and (3) performing a save operation after modification or no modification to obtain an operation permission for the to-be-authorized role to operate the statistical list.

In this embodiment, the grantee has a role of an independent individual nature. When an employee is resigned or transferred from a post, the operation permissions for the statistical list are handed over and updated simply by creating or canceling a relation of the user to role, thereby achieving seamless handover of the operation permissions, ensuring timely update of the user's operation permissions for the statistical list, avoiding hysteresis or omission of update of the operation permissions, avoiding impact on the normal operation of the enterprise, and avoiding the risk of leaking confidential information.

Resignation example: The user corresponding to an employee Zhang San is related to a role of "production worker 1". When Zhang San is resigned, the system administrator (or the corresponding administrator) directly cancels the relation between the user corresponding to Zhang San and the role of "production worker 1". Therefore, Zhang San automatically loses the statistical list operation permissions corresponding to "production worker 1", thereby avoiding hysteresis of handover of statistical list operation permissions, and preventing relevant confidential information from being leaked to Zhang San in the case that Zhang San still has the permission to view certain confidential information after resignation due to the hysteresis. When a new employee Li Si takes over Zhang San's work, the user corresponding to Li Si is directly related to "production worker 1". In this way, Li Si automatically obtains the statistical list operation permissions corresponding to the role "production worker 1", and it is not necessary to set the statistical list operation permissions for Li Si again, thereby simplifying and quickening the operations and greatly reducing the workload.

Job transfer example: An employee Zhang San needs to be transferred from the production department to the after-sales department. The system administrator (or the corresponding administrator) cancels the relation between the user corresponding to Zhang San and the original role "production worker 1", and relates Zhang San to a new role "after-sales staff 3" of the after-sales department, so that Zhang San automatically obtains the statistical list operation permissions corresponding to the role "after-sales staff 3".

In the following, the advantages of authorizing the user by using the role having the nature of an independent individual are analyzed: The user determines (obtains) permissions through its relation to the role. If the permissions of the user need to be modified, the permissions owned by the role are adjusted to achieve the purpose of changing the permissions of the user related to the role. Once the user is related to the role, the user owns all the operation permissions of the role.

A role is in a one-to-one relation to a user (when the role is related to a user, other users can no longer be related to that role; and if the role is not related to the user, the role can be selected to be related to other users; that is, during the same period, one role can only be related to one user). A user is in a one-to-many relation to roles (one user can be related to multiple roles at the same time).

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a work station number, and is also similar to the role in a film and television drama: one role in the same period (in childhood, juvenile, middle-age . . . ) can be played by only one actor or actress, but one actor or actress may play multiple roles respectively.

After the role is created, a user may be related to the role in the process of creating the user, or may be related to the role at any time after the user is created. After the user is related to the role, the user can be released from the relation to the role at any time, and the relation of the user to another role may be created at any time.

The said system role is composed of: a post name+a post number. For example: roles of a workshop worker 1, a workshop worker 2, a workshop worker 3, and the like each are an independent individual which is independent individuals, equivalent to the concept of a post number and a work station number, but is different from the role in the conventional permission management system. The concept of a role in the conventional rights management system is of a group or class nature such as a post, a position, a type of work or the like.

The following example shows the relationship between employees, users and roles after the employee Zhang San enters a company: 1. Recruiting: after the employee is recruited, it can be done that he directly is related the role of the corresponding post number/work station number for the user (employee), for example: Zhang San has joined the company (the company has assigned a user for Zhang San), the work content is responsible for the sale of refrigerator products in Beijing area, in the sale department I, (the corresponding role is the role of "Sale Engineer 5" in the sale department I), then user Zhang Sans directly select the role of "Sale Engineer 5" and the relation can be done.

2. Adding position: After Zhang San has worked for a period of time, the company will further arrange Zhang San to be responsible for the sale of TV products in Beijing area (a corresponding role is "sale engineer 8" under sale department I) and to also serve as a supervisor of an after-sale department (a corresponding role is "after-sale department supervisor 1). In this case, two roles, that is, "sale engineer 8" under sale department I and "after-sale department supervisor 1" under the after-sale department, are additionally related to the user Zhang San. In this case, the employee Zhang San is related to three roles: "sale engineer 5" and "sale engineer 8" under sale department I, and "after-sale department supervisor 1" under the after-sale department. Therefore, the user Zhang San has permissions of the three roles.

3. Reducing position: After a while, the company decided to let Zhang San serve as the post-sale manager (corresponding to a role "after-sale manager" under the after-sale department) and no longer take up other post. Then user Zhang San is related to the role of "after-sale manager" in the after-sale department 1, and cancels the three roles previously related ("sale engineer 5" and "sale engineer 8" under sale department I, and "after-sale department supervisor 1" under the sale department) at the same time. In this case, the user Zhang San only has the authority of the role of "after-sales manager" under the after-sales department.

4. Adjustment of permission of role (for the adjustment of the permissions of the role itself): If the company decides to add permission to the after-sale department manager, the permission only need to be added to the role of the after-sale department manager. With the increase in the permission of the role of the after-sale department manager, the permission of the user Zhang San are also increased.

5. Resigning: After one year, Zhang San resigns, it is only necessary to cancel the relationship between Zhang San's user and the role of "after-sales manager" under after-sales department.

For example, during dynamic operation of the company, recruiting and resigning of staff often occur continuously, but post numbers or work station numbers seldom change (or even remain unchanged within a period of time).

In the conventional authorization method: in the case of a large number of system functions points, not only the authorization workload is large, complicated, but also easy to make mistakes, in the authorization with the conventional group/class role. Even if it is wrong, it is not easy to find in a short time. It is easy to cause damage to the system user.

In the authorization method according to the present application, the role in the nature of a post number or work station number nature are authorized in the present application, and users are related to the roles so that permissions of the users are determined. Therefore, the permission of the users are controlled merely through a simple user-role relation. Such that permission control is in a simple, easy to operate, clear, and explicit manner, thereby significantly improving efficiency and reliability of authorization.

The above is only a preferred embodiment of the present invention. It should be understood that the present invention is not limited to the forms disclosed herein, and is not to be construed as the exclusion to the other embodiments, but may be used in various other combinations, modifications and environments. Modifications can be made according to the techniques or knowledge of the above teachings or related art within the conceptive scope of the teachings herein. All changes and modifications made by those skilled in the art are intended to be within the scope of the appended claims.

What is claimed is:

1. A method for authorizing an operation permission of a statistical list, comprising:
    authorizing a statistical list operation and selecting a grantee, wherein an order between authorizing the statistical list operation and selecting the grantee is not limited;
    wherein the authorizing the statistical list operation comprising:
    selecting the statistical list needing authorization, and displaying a column name of one or more columns needing operation permission control in the statistical list; and
    authorizing the operation permission for each of the one or more columns separately, wherein
    when selecting a grantee, one or more grantees are selected;
    wherein the method further comprises setting an authorization period of a time-nature column, wherein after the time-nature column is selected, one or more of six authorization period settings are displayed for an authorizer to perform a corresponding time setting, and the one or more of the six authorization period settings comprise:
    a period from a time point earlier than current time by a fixed time length to the current time, a period from a start time to the current time, a period from an end time to a system initial time, a period from the start time to the end time, a period with a time column of a null value, and a period from the system initial time to the current time, wherein the period from the system initial time to the current time comprises the period with a time column of a null value.

2. The method according to claim 1, wherein a column not authorized for viewing is displayed in one or more of the following manners:
    displaying a column name of the column, and hiding corresponding column content; or
    hiding both the column name of the column and the corresponding column content.

3. The method according to claim 1, wherein when only one grantee is selected and the statistical list needing authorization is selected, authorization status of an operation permission previously authorized for the grantee to operate each column needing operation permission control in the statistical list is displayed.

4. The method according to claim 1, wherein when two or more grantees are selected and the statistical list needing authorization is selected, the column needing operation permission control in the statistical list is displayed, and previous authorization status of each column needing operation permission control is not displayed.

5. The method according to claim 1, wherein when only one grantee is selected and the statistical list needing authorization is selected, an authorizer performing a previous authorization operation on the statistical list for the grantee and time of such operation are displayed.

6. The method according to claim 1, further comprising:
    authorizing a template, comprising:
    selecting a grantee and the statistical list needing authorization: selecting one or more grantees, and selecting one statistical list needing authorization;
    authorizing the grantee: selecting an existing authorized grantee or a created template as an authorization template, and granting one or more statistical list operation permissions of the authorization template to the grantee; and
    performing a save operation after a modification or no modification to obtain one or more operation permissions for the grantee to operate the statistical list.

7. A method for authorizing an operation permission of a statistical list, comprising:
    authorizing a statistical list operation and selecting a to-be-authorized role, wherein an order between authorizing the statistical list operation and selecting the to-be-authorized role is not limited;
    wherein authorizing the statistical list operation comprising:
    selecting the statistical list needing authorization, and displaying a column name of one or more columns needing operation permission control in the statistical list; and
    authorizing the operation permission for each of the one or more columns separately, wherein
    when selecting the to-be-authorized role, one or more to-be-authorized roles are selected, each of the to-be-authorized roles is independent which is not a group/class, and during a same period, one role is configured to be related a user only, while the user is configured to be related to the one or more roles;
    wherein the method further comprises setting an authorization period of a time-nature column, wherein after the time-nature column is selected, one or more of six authorization period settings are displayed for an authorizer to perform a corresponding time setting, and the one or more of the six authorization period settings comprise:
    a period from a time point earlier than current time by a fixed time length to the current time, a period from a start time to the current time, a period from an end time to a system initial time, a period from the start time to the end time, a period with a time column of a null value, and a period from the system initial time to the current time, wherein the period from the system initial time to the current time comprises the period with a time column of a null value.

8. The method according to claim 7, wherein in a case that the user is transferred from a post, the method further comprises managing user transfer comprising:
canceling a relation between the user and an original role; and
relating the user to a new role, whereby the user is configured to automatically obtain statistical list operation permissions of the new role.

9. The method according to claim 7, wherein further comprising:
authorizing a template, comprising:
selecting a to-be-authorized role and the statistical list needing authorization: selecting one or more to-be-authorized roles, and selecting one statistical list needing authorization;
authorizing the to-be-authorized roles: selecting an existing role or a created template as an authorization template, and granting one or more statistical list operation permissions of the authorization template to the to-be-authorized role; and
performing a save operation after a modification or no modification to obtain one or more operation permissions for the to-be-authorized role to operate the statistical list.

\* \* \* \* \*